US005979957A

United States Patent [19]

Conrad et al.

[11] Patent Number: 5,979,957

[45] Date of Patent: Nov. 9, 1999

[54] ROLLING MAGNETIC RAKE FOR COLLECTING NAILS AND OTHER DEBRIS FROM A SURFACE

[75] Inventors: James G. Conrad, Mountlake Terrace, Wash.; Michael L Baxter, 21920 53rd Ave. W., Mountlake Terrace, Wash. 98043

[73] Assignees: Michael L Baxter; James Conrad, both of Mountlake Terrace, Wash.

[21] Appl. No.: 08/717,835

[22] Filed: Sep. 23, 1996

[51] Int. Cl.$^{6}$ .............................. B03C 1/00; B25J 15/06

[52] U.S. Cl. .......................................... 294/65.5; 209/215

[58] Field of Search ............................ 294/65.5; 15/105, 15/160; 56/400.01, 400.02, 400.04; 209/215, 216, 219, 223.1; 335/285, 288, 291, 293, 294, 302, 303, 306

[56] References Cited

U.S. PATENT DOCUMENTS

| | | | |
|---|---|---|---|
| 2,149,764 | 3/1939 | Frei | 209/215 X |
| 2,415,730 | 2/1947 | Davis | 294/65.5 X |
| 2,455,319 | 11/1948 | Stearns | 209/215 |
| 2,648,434 | 8/1953 | Russell | 294/65.5 X |
| 2,678,729 | 5/1954 | Spodig | 209/219 X |
| 2,709,002 | 5/1955 | Hoff | 294/65.5 X |
| 3,343,675 | 9/1967 | Budd | 294/65.5 X |
| 3,498,455 | 3/1970 | Kirby | 209/223 |
| 4,087,879 | 5/1978 | Spence | 15/142 |
| 4,155,298 | 5/1979 | Spence | 15/142 |
| 4,407,038 | 10/1983 | Hasse | 15/105 |
| 4,728,419 | 3/1988 | Grun | 209/219 |
| 4,904,376 | 2/1990 | Hasse | 209/215 |
| 5,285,904 | 2/1994 | Hasse | 209/215 |
| 5,395,148 | 3/1995 | Jameson et al. | 294/65.5 |

FOREIGN PATENT DOCUMENTS

| | | | |
|---|---|---|---|
| 122983 | 12/1946 | Australia | 294/65.5 |

*Primary Examiner*—Johnny D. Cherry

[57] ABSTRACT

A plurality of essentially round wheel shaped magnets on an axle transverse to a handle. The magnets are polarized axially and positioned with like poles adjacent. The roller rake is rolled over a surface and sweeps a swathe clean of magnetically attractable debris. The roller rake is particularly suited for cleaning nails from grassy areas such as commonly found in re-roofing and other construction projects, and for sweeping large areas such as factory floors. The magnets are arranged to project a magnetic field before, under, and behind the operating head.

18 Claims, 2 Drawing Sheets

ROLLING MAGNETIC RAKE FOR COLLECTING NAILS AND OTHER DEBRIS FROM A SURFACE

BACKGROUND OF THE INVENTION

1. Field of the Invention

Magnetic broom, brush, or rake for sweeping an area clear of magnetically attractive debris, particularly for picking up nails and the like from a construction site.

2. Description of the Prior Art

Magnetic sweeping devices are known in the prior art and have been used in a variety of situations involving collection of ferro-materials. Certain activities in construction or repair of buildings scatter nails over the work site. Most notably, re-roofing of dwellings releases thousands of nails, many of which fall to the attic floor insulation and ground around the building. In most cases, these are grass lawns, driveways, flower beds, and other places where loose nails are considered a hazard. The present invention is specifically designed to retrieve nails, nail parts, and staples from just such difficult and varied surfaces as well as indoor surfaces such as a factory floor.

Most previous inventions for picking up magnetic debris from surfaces rely on fixed magnets, with or without pole pieces, supported a fixed distance over the surface. Most use bar or rod magnets oriented transversely to the preferred direction of motion.

MAGNETIC SWEEPER CONSTRUCTION, U.S. Pat. No. 5,285,904, Feb. 15, 1994, by Gerald A. Hasse, and his U.S. Pat. No. 4,407,038, Oct. 4, 1983, are typical of this genus. The support spacing is provided by wheels. The spacing away from the floor necessarily reduces the attracting field at the floor. The debris is collected in the space between the magnet and floor. Haase discloses that his magnets are spaced apart, but does not disclose the direction of magnetization or orientation of the poles. Haase's invention should operate most effectively with the magnet polarization N-S in the direction of the motion, i.e., transverse to the axle. Haase has spacing in other embodiments clearly to provide means to have lateral flexibility in his magnet assembly. In all embodiments, the spacing is the result of end walls on the magnet holding chambers. With the polarization suggested above, spacing has no affect on the effectiveness of the invention.

MAGNETIC RAKE, U.S. Pat. No. 5,395,148, by G. Jameson, et al, Mar. 7, 1995, is a variation of the spaced above the surface design, where bar or rod magnets are enclosed in a non-magnetic tube which is slid over the surface being cleaned. This puts the magnets very close to the floor, preserving the strength of the magnetic field. Debris is often trapped between the tube and floor, causing the likelihood of scratching the floor. When used in grass, Jameson's invention bends the grass stems over, trapping the nails under the grass, preventing the magnet from lifting them out of the grass mat, Jameson's second embodiment is a flat plate design which exaggerates the problems described for the tubular embodiment.

Many patents are on file where similar magnet systems are mounted on various pieces of housekeeping, yard, or farm equipment, especially household vacuum cleaners, including two others by Gerald Haase earlier than the citations above.

The wheel supported genus of magnetic sweeper rakes does not mechanically penetrate the surface being cleaned, and do not have sufficient magnetic reach to get into rough or grassy surfaces; thus, they are generally unsatisfactory for use in grass, loose dirt, and the like.

SHAG RUG FLUFFING AND OBJECT RETRIEVING DEVICE, U.S. Pat. No. 4,155,298, by Forrest Spence, May 29, 1979 and his earlier version, U.S. Pat. No. 4,087,879, have a series of combing tines on a rotating body. The primary purpose of the invention is to comb out tangles and fluff shag rugs. Small rod magnets are within the tines, thus reach into the rug, but the action of the primary utility, combing the rug, tends to clear the debris from the tines, putting it back onto the rug. Mr. Spence's later improvement is in part to overcome this by providing a means to transfer the debris from the tines to a storage magnet.

Spence's tines are of non-magnetic material, which spaces the enclosed magnets from the work surface and reduces the force of attraction for pickup and/or retention to remove the debris from the rug.

3. Objects of the Invention

The present invention is designed to overcome the objections and limitations of the prior art as the following objects, descriptions, and claims will illustrate.

It is an object of the present invention to generate a strong magnetic field to pick up ferrous debris along a swathe over an indistinct surface and having entanglements such as is found in grassy areas.

It is a further object of the invention to have the magnets in contact with, and rolling over, the surface being cleaned.

It is a further object of the invention to have the magnets loosely mounted on a bearing shaft so that transverse motion is permitted for working around small obstructions such as clumps of grass, clods of dirt, or rocks.

It is a further object of the invention to provide a handle so the magnetic rake invention is used in the manner of a push-broom.

It is a further object of the invention to provide a place for tying a hoisting rope to the invention for lifting onto a high place such as a building roof. The tying place may also be a gripping handle for easy manipulation of the tool.

It is a further object of the invention to focus the magnetic field to reach before, under, and behind the axis of the magnet assembly.

It is a further object of the invention to provide magnetic field that tends to direct debris away from the rolling surface to a storage zone.

The foregoing and other objects and advantages of this invention will appear from the following descriptions taken in connection with the accompanying drawings of the preferred embodiment.

SUMMARY OF THE INVENTION

A plurality of cylindrical magnets having an axial hole (donut magnets) are rotably and translatably mounted on an axle with their like poles facing together. The magnets are charged so that the opposite ends of the cylinders, that is the flat sides, are the North and South poles as depicted in FIG. 4. In this configuration, the magnets repel each other and rest in spaced apart positions along the axle. Having like poles facing each other squeezes the magnetic fields, forcing the fields to extend more radially from the magnets.

Since magnetic forces are elastic, the magnets, while held separated, are relatively free to move axially along the axle. The action is similar to being separated by compression springs.

A broom-like handle is attached perpendicularly to the axis of the axle for manipulation in a manner similar to the familiar push broom. An optional gripping piece may be included on the handle end opposite the magnets. A cross T, shovel-type D, or ring would be typical and also serve as a place to tie a rope for hoisting the sweeper to a roof, or for hanging the sweeper on a nail or peg for storage.

Small versions of the invention are suited for bench-top, small area, furniture, clothing, and machine tool cleaning.

Experiments with 2.38 inch diameter×0.28 thick magnets spaced 3 inches disclose that the distance at which nails are attracted when like poles are adjacent is approximately 1 ½ inches, and the nails migrate to the flat faces of the magnets. The same magnets and spacing with opposite poles adjacent attracted the same nails from a distance of ½ inches.

DETAILED DESCRIPTION OF THE INVENTION

Figure 1:
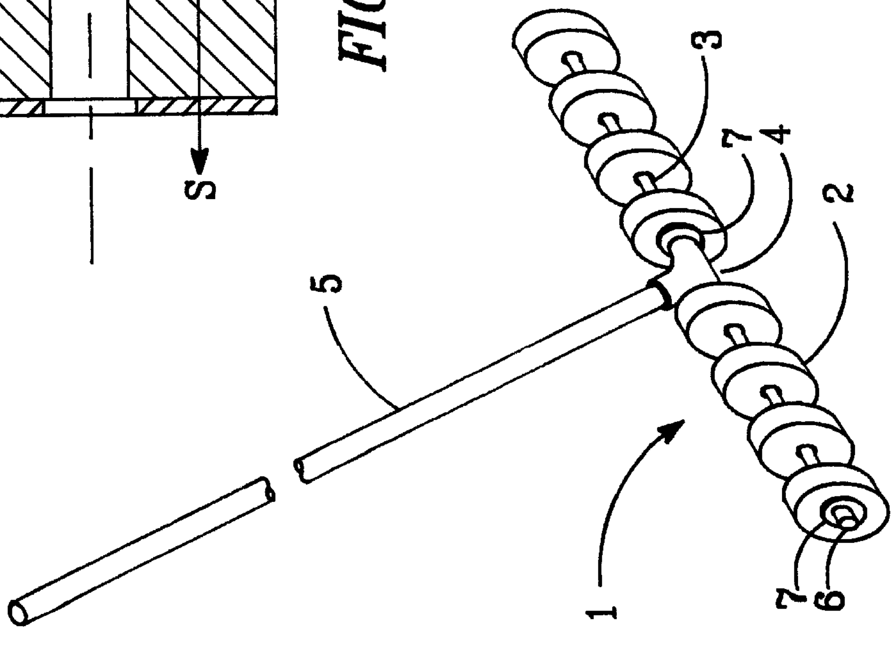
FIG. 1 is a view of the T configuration of the invention.

The invention may be best seen in FIG. 1. The rake, identified generally as 1, is comprised of three main systems, a handle 5, an axle 2 of non-magnetic material, and short cylindrical permanent magnets 3.

The magnets have an axial length less than ½ their diameter, an axial bore, magnetized axially, and are oriented on the rake axle to repel each other, i.e., to have like poles adjacent, NS-SN-NS-SN-NS etc.

A handle attachment fitting 4, shown in FIG. 1 is attached centrally and perpendicular to the axle. The handle 5 is conventional. Wood, metal, plastic pipe, and other suitable handles and co-operating attaching fittings are readily available in the marketplace. The Attachment of the handle to the fitting may be permanent, or removable, usually by a threaded means.

Figure 2:
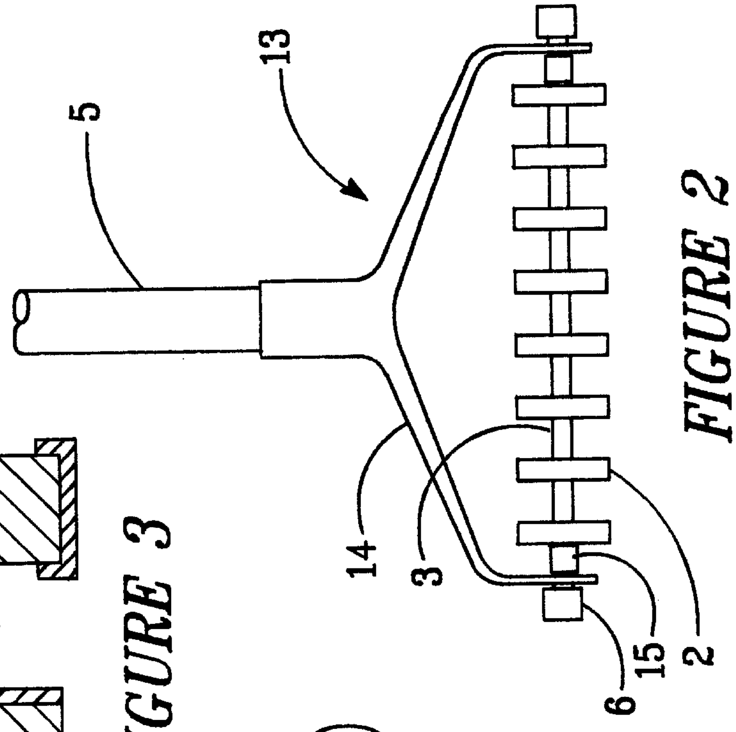
FIG. 2 is a view of the yoke configuration of the invention.

The preferred material for the axle is copper or plastic tubing because it is easily replaced from supplies usually readily available on a construction site. Brass, aluminum, or wood is equally acceptable to the inventive concept. The axles are terminated with means to prevent the magnets falling off. Any conventional means will work with the invention, FIGS. 1 and 2 show the axle capped with end caps 6 . Thrust washers 7 are optional and may be used as shims or bearings.

It is necessary to provide some way to disassemble the axle assembly to replace broken or worn parts. Therefore, the caps 6 or their equivalent must be removable from the axle, which may be either one or two lengths of tubing. In the preferred embodiment, the parts of the whole assembly are secured by a combination of threaded, glued, soldered, or pinned attachments. Typical pinning is by roll pins or cotter keys (not shown). The ordinarily skilled mechanic practicing the invention should have no difficulty deciding which to use.

Figure 5:
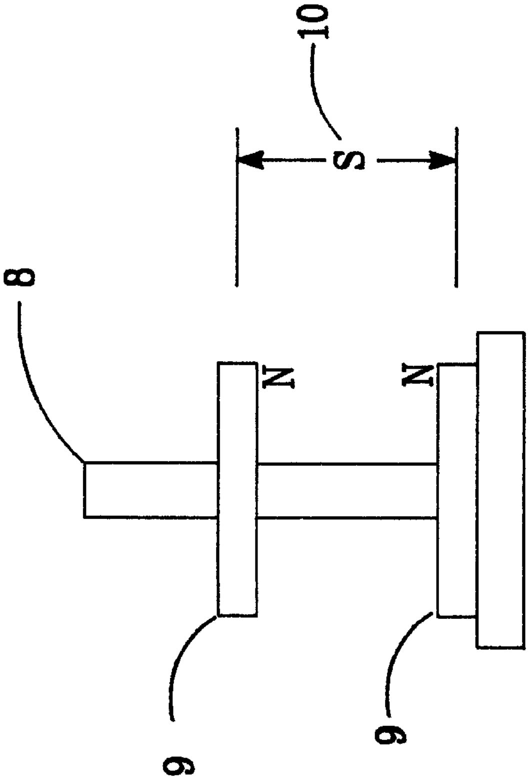
FIG. 5 depicts the test set-up to determine the proper spacing of the magnets in the invention.

The magnets should be spaced between ¾ to 3 times the diameter. The Preferred magnet spacing depends primarily on the strength and diameter. It has been found that the following steps using the apparatus shown in FIG. 5 take into account the magnet strength for determining a satisfactory spacing.

1. Set the axle 8 or a similar shaft into a vertical position,
2. place two of the magnets 9 over the axle, like poles facing each other,
3. measure the center to center spacing S, 10 between the magnets.

The measurement S is the maximum preferred spacing to be used in the invention. The minimum spacing is approximately 75% of S. The appropriate axle length is found by the formula:

(s)×(Number of magnets−1)+(thickness of a magnet)+(an allowance for the end caps and thrust washers). This spacing ensures that there is a bias force to hold the magnets in the optimum position.

The magnets will assume even spacing when the axle is placed in a horizontal attitude. The magnets are free to move along the axle under influence of external forces such as passing around obstructions. No spacers between magnets are needed.

For general use, the magnets may be from 1-½ to 7-½ inches in diameter. Smaller magnets may be found useful for special cleaning such as around assembly benches, sewing machines, etc.

Figure 4:
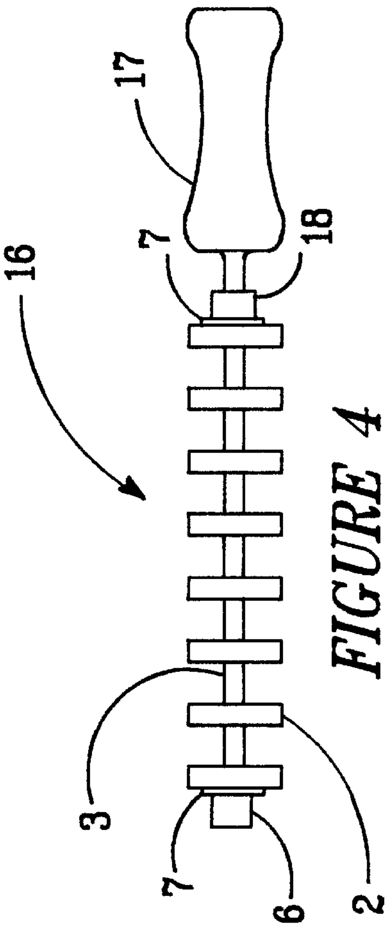
FIG. 4 is a cross section along a diameter of one of the magnets showing polarity and optional protective face plates or tire.

FIG. 4 illustrates a typical magnet with optional protective tire 11 or side pieces 12. The magnets may be made of any available retentive material. The preferred material is known in the trade as a ceramic magnet, which is a pressed and sintered vitreous-like material. Ceramic magnets are very brittle and easily chipped by impact forces. Therefore, some protection is desirable, but not mandatory. A tire of non-magnetic material stretched over the rim will adequately protect the edges, have no effect on the field strength, and only slightly diminish the ability of the magnet to hold nails. An optional protector is to attach disks of at least the same diameter as the magnets to the faces of the magnets. Disks of non-magnetic materials must be attached, preferably by gluing. Disks of magnetic material, preferably steel washers approximately 0.03 to 0.07 inch thick, will adhere by magnetism alone. However, gluing may be used to prevent dirt from working behind the pole pieces and removing reliance on the central hole for holding alignment. Magnetic protective disks do not significantly distort the magnetic field and preserve the maximum debris holding power of the magnet faces.

The hard magnets turn on the axle and unless a bearing is provided (not shown), some wear is to be expected. Since the axle is easily replaced, this is not a serious drawback and a bearing is optional except as described later herein.

To turn freely, the axle diameter should be approximately 0.010 inch smaller than the co-operating bushing or magnet bore. Also, it has been found that if the length of the magnet bore, i.e., thickness of the magnet, is less than 1 axle diameter, binding and/or excess wear occurs. In such cases, the effective thickness of the magnet has to be increased. A non-magnetic plastic or metallic bushing (not illustrated) longer than the thickness of the magnet is passed through the central hole and attached to the magnet to give the requisite bearing length.

ALTERNATIVE EMBODIMENTS

FIG. 2 illustrates a second embodiment of the invention, identified generally as 13. The setting up and functioning of the magnets is the same. The only difference is that the handle attachment is a yoke shape 14. The structural details of yoke 14 are conventional, and the handle shaft and yoke combined are collectively referred to as the handle. Spacers 15 at the ends of the magnet array provide about ¾ inch clearance for nails collected on the yoke side of the outer magnets.

Figure 3:
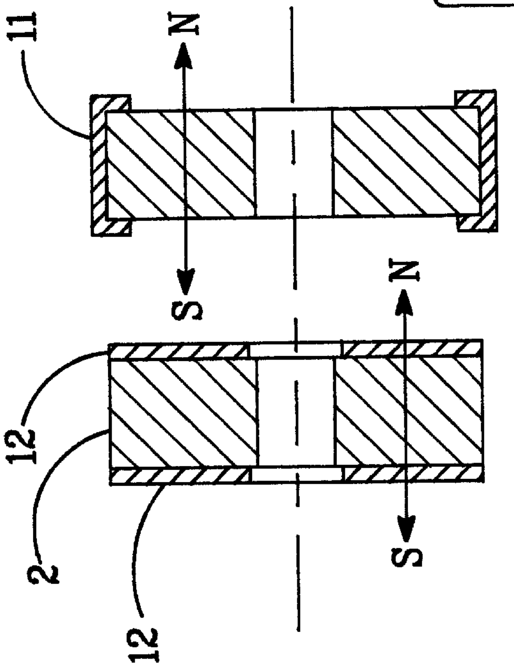
FIG. 3 is a wand configuration of the invention.

FIG. 3 illustrates a third embodiment of the invention, identified generally as 16 and described as a magnetic fox tail broom. The setting up and functioning of the magnets is the same. The only difference is that the handle is an extension of the axle. Sculptured grip portion 17 is optional, as the extended axle is sufficient for holding and operating this embodiment of the rake. Collar 18 is illustrated as a specific element at the terminus of the magnet assembly, but an enlarged distal end of a grip piece can provide the equivalent function.

OPERATION OF THE INVENTION

The foregoing describes the construction of the invention and alludes to its operation. To use, the handle is grasped and the rollers pushed and pulled over and through the surface, grass, loose dirt, etc, where nails are expected to be lodged. The nails will be attracted to the magnets and will work their way along the lines of magnetic force to the side faces of the magnets. When the magnet faces are filled with nails, the nails and other attractants are manually removed with the fingers and/or a scraper like a stick of wood.

The wand embodiment illustrated in FIG. 3 is operated similarly, except the handle is gripped in carving knife fashion. The brushing action is similar to using the familiar "fox-tail" brush.

The broom style handle may be removed for storage.

Various sizes and minor variations of the invention are intended to be adapted to accomplish cleaning of other articles or machinery.

While specific embodiments of the magnetic rake have been disclosed in the foregoing description, it will be understood that various modifications within the spirit of this invention will occur to those skilled in the art without departing from the spirit of this invention and the scope of the appended claims.

We claim:

1. A magnetic rake for picking up magnetically attractable debris from a surface comprising in combination:

a) a transversely elongated axle having a handle member mounted thereon;

b) a plurality of magnets each having first and second faces, a bore extending from first to second said faces, a magnetic charge whereby said first face is the North pole, and the second face is the South pole;

c) said axle traversing said bores to support said magnets spaced apart and having like poles facing together;

d) thereby creating spaces between magnets where attractable debris collects by being magnetically urged along lines of magnetic force as the magnetic rake is passed over a surface to be cleaned.

2. The magnetic rake of claim 1 wherein the magnets are loosely mounted on the axle, wherein said magnets are held in spaced apart relationship by said magnetic repulsion forces.

3. The magnetic rake of claim 1 wherein the handle member is attached coaxially to the axle.

4. The magnetic rake of claim 1 wherein the handle member is attached transversely to the axle.

5. The magnetic rake of claim 1 further comprising means for protecting the magnets from impact forces, said protection means being tires comprised of non-magnetic material covering the magnet surface radially surrounding said bore, whereby said tires absorb the impact forces.

6. The magnetic rake of claim 1 further comprising means for protecting the magnets from impact forces, said protection means being plates comprised of magnetic material covering the said first and second faces, whereby said plates absorb the impact forces.

7. A magnetic rake for picking up magnetically attractable debris from a surface comprising in combination:

a) a transversely elongated axle having a handle member mounted thereon;

b) a plurality of essentially cylindrical magnets each having first and second essentially circular faces, a concentric bore extending through said faces, a magnetic charge whereby said first face is the North pole, and the second face is the South pole;

c) said magnets mounted on said axle, being spaced apart with like poles adjacent;

d) thereby creating spaces between magnets where attractable debris collects by being magnetically urged along lines of magnetic force;

e) whereby said magnets are rolled over a surface having magnetically attractable particles thereon, thereby attracting the particles to the magnets where they are retained in the spaces between the magnets until removed.

8. The magnetic rake of claim 7 wherein the magnets are mounted rotationally loose on the axle, thereby the magnets rotate around the axle as the rake is moved over the surface to be cleaned of magnetic debris.

9. The magnetic rake of claim 7 wherein the magnets are mounted translationally loose on the axle, wherein said magnets being spaced apart, are held in spaced apart relationship by magnetic repulsion forces and said spacing is more than three quarters and less than three diameters of said cylindrical surface.

10. The magnetic rake of claim 7 further comprising means for protecting the magnets from impact forces, said protection means being tires comprised of non-magnetic material covering the cylindrical magnet surface radially surrounding said bore, whereby said tires absorb the impact forces.

11. The magnetic rake of claim 7 further comprising means for protecting the magnets from impact forces, said protection means being plates comprised of magnetic material covering the said first and second faces, whereby said plates absorb the impact forces.

12. The magnetic rake of claim 7 wherein the handle member is attached coaxially to the axle.

13. The magnetic rake of claim 7 wherein the handle member is attached transversely to the axle.

14. A magnetic rake for picking up magnetically attractable debris from a surface comprising in combination:

a) a transversely elongated axle having a handle member mounted thereon;

b) a plurality of essentially cylindrical magnets each having first and second essentially circular faces, a concentric bore extending through said faces, a magnetic charge whereby said first face is the North pole, and the second face is the South pole, and a cylinder axial length less than one half the cylindrical diameter;

c) said magnets mounted rotatably and translationally movable on said axle;

d) a magnetic debris collection means being said magnets spaced apart by magnetic repulsion forces derived from the magnets being mounted with like poles adjacent, wherein debris collects by being magnetically urged along lines of magnetic force into said spaces;

e) whereby said magnets are rolled over a surface having magnetically attractable particles thereon, thereby attracting the particles to the faces of the magnets where they are retained in the spaces between the magnets until removed.

15. The magnetic rake of claim 14 further comprising means for protecting the magnets from impact forces, said protection means being tires comprised of non-magnetic material covering the cylindrical magnet surface radially surrounding said bore, whereby said tires absorb the impact forces.

16. The magnetic rake of claim 14 further comprising means for protecting the magnets from impact forces, said protection means being plates comprised of magnetic material covering the said first and second faces, whereby said plates absorb the impact forces.

17. The magnetic rake of claim 14 wherein the handle member is attached coaxially with the axle.

18. The magnetic rake of claim 14 wherein the handle member is attached transversely to the axle.

* * * * *